United States Patent
Liang et al.

(10) Patent No.: US 12,452,982 B2
(45) Date of Patent: Oct. 21, 2025

(54) SIGNAL ANALYSIS PROTOCOL CHANGING METHOD FOR WIRELESS LAMP

(71) Applicant: Guangzhou Rising Dragon Recreation Industrial Co., Ltd., Guangzhou (CN)

(72) Inventors: Bo Liang, Guangzhou (CN); Ziqin Guo, Guangzhou (CN)

(73) Assignee: GUANGZHOU RISING DRAGON RECREATION INDUSTRIAL CO., LTD., Guangzhou (CN)

( * ) Notice: Subject to any disclaimer, the term of this patent is extended or adjusted under 35 U.S.C. 154(b) by 142 days.

(21) Appl. No.: 18/491,830

(22) Filed: Oct. 23, 2023

(65) Prior Publication Data

US 2024/0224406 A1  Jul. 4, 2024

(30) Foreign Application Priority Data

Dec. 30, 2022 (CN) .......................... 202211735720.3

(51) Int. Cl.
 *H05B 47/195* (2020.01)
 *H05B 47/175* (2020.01)
 *H05B 47/18* (2020.01)

(52) U.S. Cl.
 CPC ......... *H05B 47/195* (2020.01); *H05B 47/175* (2020.01); *H05B 47/184* (2024.01)

(58) Field of Classification Search
 CPC .... H05B 47/195; H05B 47/19; H05B 47/184; H05B 47/175; Y02B 20/40
 See application file for complete search history.

(56) References Cited

U.S. PATENT DOCUMENTS

| | | | |
|---|---|---|---|
| 2015/0163888 A1* | 6/2015 | Fredricks | A01K 63/06 315/153 |
| 2015/0349973 A1* | 12/2015 | Camden | H05B 47/19 340/12.5 |

\* cited by examiner

*Primary Examiner* — Daniel D Chang
(74) *Attorney, Agent, or Firm* — Andrew C. Cheng

(57) ABSTRACT

A signal analysis protocol changing method for a wireless lamp comprises: Step 1: presetting a plurality of analysis protocols in the wireless lamp, wherein the analysis protocols are in one-to-one correspondence with control signals sent by different manufacturers; Step 2: presetting a plurality of change signals in an encoder, wherein the change signals are used to activate the corresponding preset analysis protocols in the wireless lamp; Step 3: establishing a communication connection between the encoder and the wireless lamp; Step 4: transmitting a change signal to the wireless lamp by the encoder; Step 5: receiving and analysing the change signal by the wireless lamp; Step 6: activating the corresponding analysis protocol according to an analysis result by the wireless lamp; and Step 7: disconnecting the communication between the wireless lamp and the encoder.

7 Claims, 5 Drawing Sheets

SIGNAL ANALYSIS PROTOCOL CHANGING METHOD FOR WIRELESS LAMP

FIELD

The application relates to the field of lamps, and particularly relates to a signal analysis protocol changing method for a wireless lamp.

BACKGROUND

During using of lamps, controllers provided by different manufacturers can only control LED lamps with corresponding protocols, and when controllers are changed, the lamps need to be changed accordingly, that is, lamp manufacturers have to produce LED lamps with different protocols according to different cooperative partners. In order to reduce the production cost of lamps, it is necessary to provide a lamp capable of adapting to controllers of multiple manufacturers. For this purpose, control protocols of multiple manufacturers should be integrated into one lamp, and a method for quickly and freely changing the protocols should be designed for the lamp.

SUMMARY

To solve the technical problem that lamps in the prior art are low in universality because controllers provided by different manufacturers can only control LED lamps with corresponding protocols, the application provides a signal analysis protocol changing method for a wireless lamp.

The application provides a signal analysis protocol changing method for a wireless lamp, the wireless lamp receiving a control signal, sent by a preset controller, by means of a lamp holder and correspondingly analysing the control signal according to a selected analysis protocol to obtain light control information to drive a lamp bead to change emitted light, wherein the signal analysis protocol changing method for the wireless lamp comprises:

Step 1: presetting a plurality of analysis protocols in the wireless lamp, wherein the analysis protocols are in one-to-one correspondence with control signals sent by different manufacturers;

Step 2: presetting a plurality of change signals in an encoder, wherein the change signals are used to activate the corresponding preset analysis protocols in the wireless lamp;

Step 3: establishing a communication connection between the encoder and the wireless lamp;

Step 4: transmitting a change signal to the wireless lamp by the encoder;

Step 5: receiving and analysing the change signal by the wireless lamp;

Step 6: activating the corresponding analysis protocol according to an analysis result by the wireless lamp; and Step 7: disconnecting the communication between the wireless lamp and the encoder.

Preferably, wherein the wireless lamp comprises an LED lamp, an LED drive module, a first control module and an infrared signal receiving module, and the analysis protocols are preset in the first control module.

Preferably, wherein the lamp holder comprises a first infrared signal transmitting module corresponding to the infrared signal receiving module, and a second control module, and the second control module is configured for converting the control signal into an infrared control signal and then transmitting the infrared control signal to the wireless lamp through the first infrared signal transmitting module.

Preferably, wherein the encoder is an infrared encoder, the infrared encoder comprises a second infrared signal transmitting module corresponding to the infrared signal receiving module, and a third control module, and the change signals are preset in the third control module and are infrared coded signals.

Preferably, wherein the analysis protocols comprise, but are not limited to, DMX512, KNX, MODBUS and ART-NET.

Preferably, wherein the change signal comprises a data head, protocol data and verification data.

Preferably, wherein the data head is specifically a piece of 6 BITs data with a fixed value, and the protocol data is specifically a piece of 5 BITS data and comprise analysis protocol information.

Preferably, wherein the data head comprises three continuous pulses, and each of the pulses sequentially comprises a 60 ms high level and a 60 ms low level.

Preferably, wherein the verification data is specifically a piece of 8 BITS data obtained by verifying the data head and the protocol data through a CRC8 algorithm.

The signal analysis protocol changing method for a wireless lamp provided by the application fulfils the following beneficial effects:

According to the signal analysis protocol changing method for a wireless lamp, controller analysis protocols of multiple manufacturers are integrated in the wireless lamp, and a change signal is generated by the encoder through a wireless coding method, transmitted wirelessly, and finally received and analysed by the wireless lamp to activate a corresponding analysis protocol, such that the analysis protocol of the lamp can be changed quickly, the universality of the lamp is improved, and the protocol can be switched more conveniently, and does not need to be changed in a wired manner anymore after a controller is changed.

DESCRIPTION OF THE EMBODIMENTS

A signal analysis protocol changing method for a wireless lamp provided by the application will be further described below in conjunction with the accompanying drawings. It should be pointed out that the technical solution and design principle of the application are expounded below with reference to an optimal technical solution.

It should be noted that, in the whole description of the application, nouns of locality such as terms including "centre", "crosswise", "lengthwise", "lateral", "length", "width", "thickness", "upper", "lower", "front", "back", "left", "right", "vertical", "perpendicular". "horizontal", "top", "bottom", "inner", "outer", "clockwise" and "anticlockwise" are used to indicate directional or positional relationships based on the accompanying drawings or to indicate directional or positional relationships commonly known by those skilled in the art merely for facilitating and simplifying the description of the application, and do not imply that a device or element referred to must be in a specific direction, or be constructed and operated by a specific direction, so they should not be construed as limiting the specific protection scope of the application.

The application provides a signal analysis protocol changing method for a wireless lamp, which is applied to a wireless lamp system with an infrared coding function.

Figure 2:
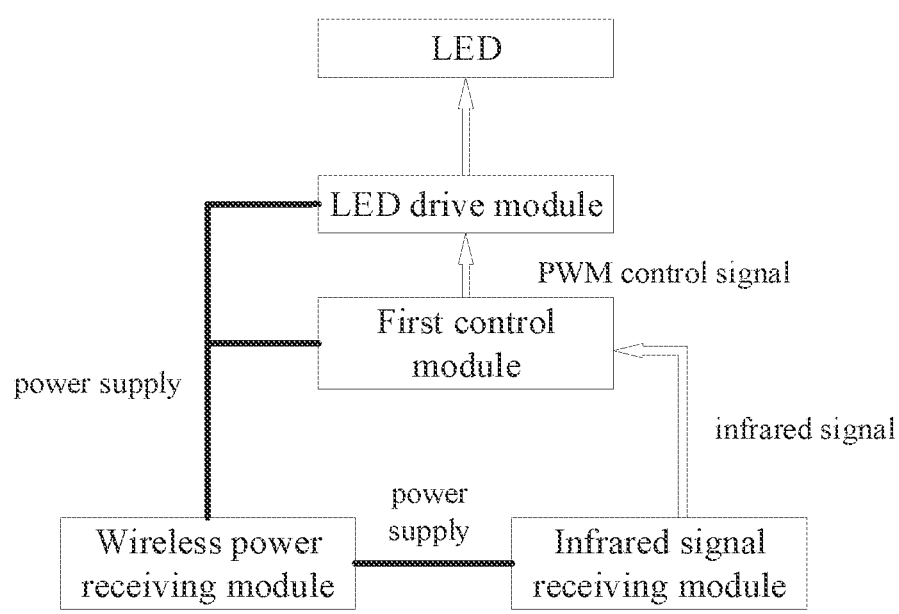
FIG. 2 is a structural diagram of a wireless lamp according to the first embodiment of the application.
Figure 3:
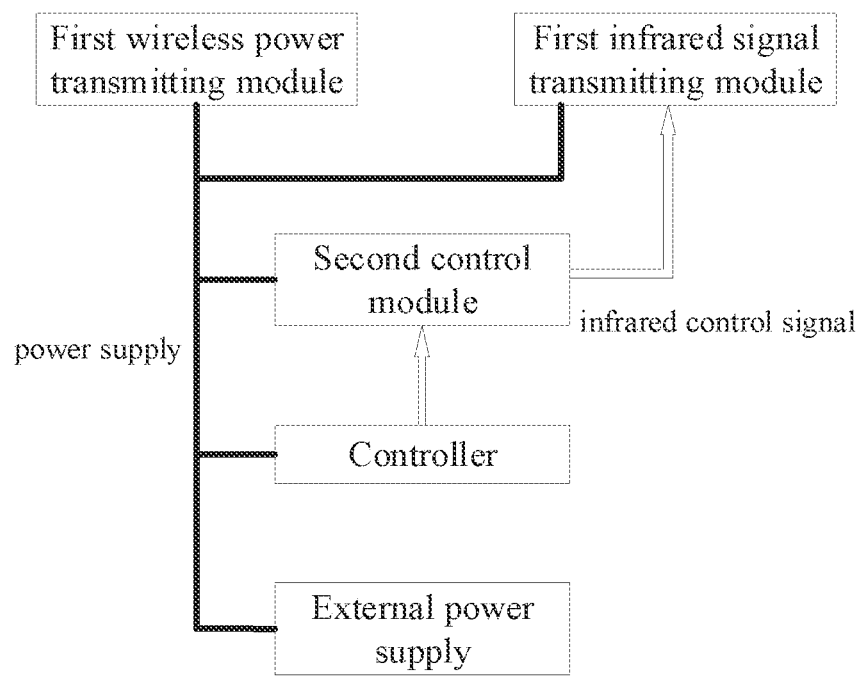
FIG. 3 is a structural diagram of a lamp holder according to the first embodiment of the application.
Figure 4:
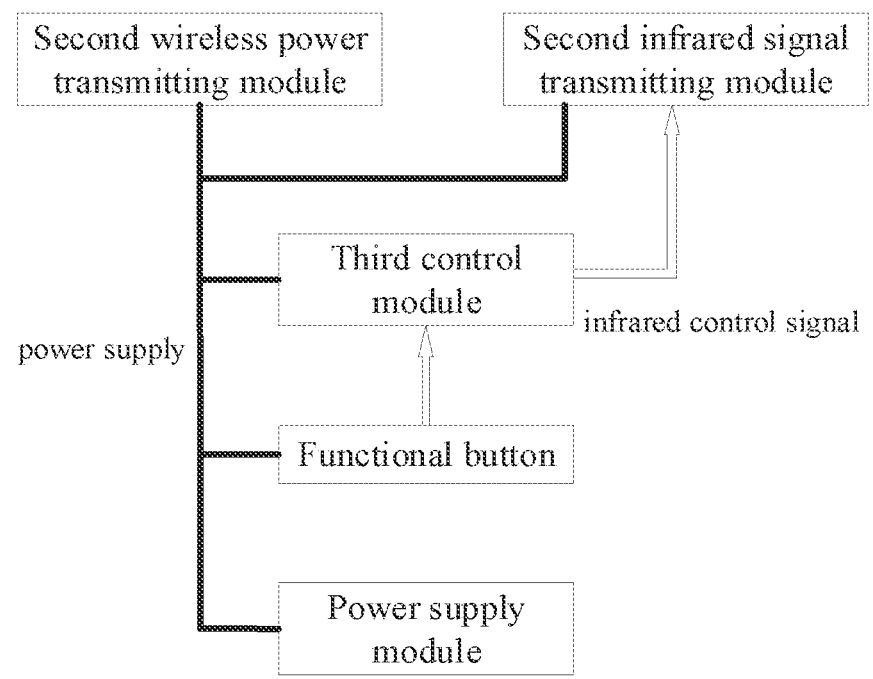
FIG. 4 is a structural diagram of an encoder according to the first embodiment of the application.

Specifically, as shown in FIG. 2, FIG. 3 and FIG. 4, a first embodiment of the application provides a wireless lamp system with an infrared coding function, which comprises a wireless lamp, a lamp holder and an infrared encoder, wherein multiple manufacturer analysis protocols are integrated in the wireless lamp, the lamp holder is configured for supplying power to the wireless lamp and transmitting an infrared control signal to drive the wireless lamp to change emitted light, the infrared encoder is configured for transmitting an infrared coded signal, and the wireless lamp analyses the infrared coded signal and then selectively changes the current manufacturer analysis protocol into the manufacturer analysis protocol corresponding to the analysed infrared coded signal to analyse a control signal, sent by a controller, received from the lamp holder, such that light control information is obtained to drive the wireless lamp to change emitted light correspondingly.

Figure 1:
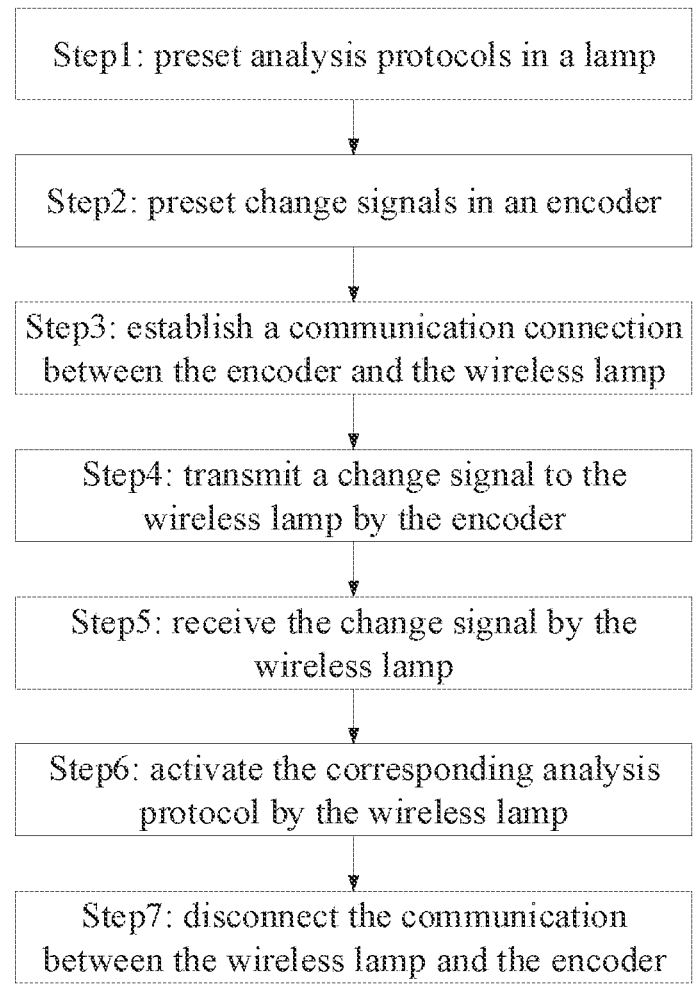
FIG. 1 is a flow diagram of the steps of a signal analysis protocol changing method for a wireless lamp according to a first embodiment of the application.

As shown in FIG. 1, the signal analysis protocol changing method for a wireless lamp comprises Step 1-Step 7, which are specifically as follows:

Step 1: presetting a plurality of analysis protocols in the wireless lamp, wherein the analysis protocols are in one-to-one correspondence with control signals sent by different manufacturers; Step 2: presetting a plurality of change signals in an encoder, wherein the change signals are used to activate the corresponding analysis protocols preset in the wireless lamp; Step 3: establishing a communication connection between the encoder and the wireless lamp; Step 4: transmitting a change signal to the wireless lamp by the encoder; Step 5: receiving and analysing the change signal by the wireless lamp; Step 6: activating the corresponding analysis protocol according to an analysis result by the wireless lamp; and Step 7: disconnecting the communication between the wireless lamp and the encoder.

Wherein, as shown in FIG. 2, FIG. 3 and FIG. 4, in this embodiment, the wireless lamp comprises an LED lamp, an LED drive module, a first control module, an infrared signal receiving module and a wireless power receiving module, wherein analysis protocols in one-to-one correspondence with control signals sent by different manufacturers are preset in the first control module; the lamp holder converts a control signal emitted by a controller into an infrared control signal and transmitting the infrared control signal to the infrared signal receiving module, the infrared control signal is processed correspondingly and then transmitted to the first control module to be analysed, and the first control module outputs a PWM control signal to the LED drive module according to an analysis result to drive the LED lamp to change emitted light.

Wherein, the lamp holder is electrically connected to an external power supply, and comprises a first wireless power transmitting module, a first infrared signal transmitting module and a second control module, the first wireless power transmitting module is matched with the wireless power receiving module to activate the wireless lamp, and the second control module converts the control signal into the infrared control signal and then transmits the infrared control signal to the wireless lamp through the first infrared signal transmitting module.

Preferably, the first wireless power transmitting module comprises a first transmitting coil and a drive circuit, and the wireless power receiving module comprises a receiving coil corresponding to the first transmitting coil; when the wireless lamp is placed in a wireless trigger area of the lamp holder, electromagnetic induction occurs between the first transmitting coil and the receiving coil, such that the receiving coil generates induced current to realize wireless power transmission; and the first infrared signal transmitting module is wirelessly connected to the infrared signal receiving module, such that the infrared receiving module can receive the infrared control signal transmitted from the lamp holder.

The controller is electrically connected to the second control module of the lamp holder, and is configured for compiling and transmitting the light control signal to control the colour, brightness or other parameters of light emitted by the wireless lamp. Further, the controller comprises a preset number of light selection buttons, each light selection button correspondingly outputs one light control signal, and each light control signal corresponds to one light effect; when one light selection button is selected, the controller outputs a light control signal corresponding to the light selection button, the second control module receives the light control signal, converts the light control signal into an infrared control signal, and transmits the infrared control signal to the wireless lamp through the first infrared signal transmitting module, the infrared control signal is received by the infrared receiving module of the wireless lamp, the infrared receiving module transmits the infrared control signal to the first control module, which analyses the infrared control signal into a corresponding PWM signal, and the LED drive module drives an LED lamp bead to emit light with a corresponding light effect.

It can be understood that the first control module may be an MCU configured for receiving the infrared signal and outputting the PWM control signal.

The encoder is an infrared encoder, and the change signal is an infrared coded signal emitted by the infrared encoder. The infrared encoder comprises a power supply module, and a second wireless power transmitting module, a second infrared signal transmitting module and a third control module which are electrically connected to the power supply module, the second wireless power transmitting module is matched with the wireless power receiving module to activate the wireless lamp to supply power to the wireless lamp, and the second infrared signal transmitting module is matched with the infrared signal receiving module to realize transmission of the infrared coded signal.

Preferably, the second wireless power transmitting module comprises a second transmitting coil corresponding to the receiving module; when the wireless lamp is placed in a wireless trigger area of the encoder, electromagnetic induction occurs between the second transmitting coil and the receiving coil, such that the receiving coil generates induced current to realize wireless power transmission; and the second infrared signal transmitting module is wirelessly connected to the infrared signal receiving module, such that the infrared receiving module can receive the infrared coded signal transmitted from the encoder.

The infrared coded signal (change signal) is preset in the third control module of the infrared encoder, and is transmitted to the infrared receiving module of the wireless lamp through the second infrared signal transmitting module. The infrared receiving module receives the infrared coded signal transmitted from the infrared encoder, the infrared coded signal is processed correspondingly and transmitted to the first control signal to be analysed, and the first control signal selectively changes a manufacturer controller protocol executed by the wireless lamp according to the analysis result.

Further, a preset number of change signal buttons are configured on the infrared encoder and electrically connected to the third control module, and each of the change signal buttons is connected to the third control module and correspondingly outputs one infrared coded signal preset in the third control module. Further, the analysis protocols preset in the first control module of the wireless lamp are in one-to-one correspondence with the infrared coded signals (change signals), and the infrared coded signals include data information for selecting the corresponding analysis protocols.

When users write a code by means of the infrared encoder, one change signal button is selected as required, the change signal button correspondingly outputs one infrared coded signal (change signal) preset in the third control module, the infrared coded signal correspondingly output by the change signal button is transmitted by the third control module to the first control module of the wireless lamp through the second infrared signal transmitting module to be analysed, and the first control module compares an analysis result of the infrared coded signal with the analysis protocols stored in the first control module one by one to select the corresponding analysis protocol to analyse an infrared control signal transmitted from the second control module.

Preferably, the analysis protocols comprise, but are not limited to, one or more of DMX512, KNX, MODBUS and ARTNET. In addition to universal analysis protocols, analysis protocols designed by manufactures can also be set.

Figure 5:
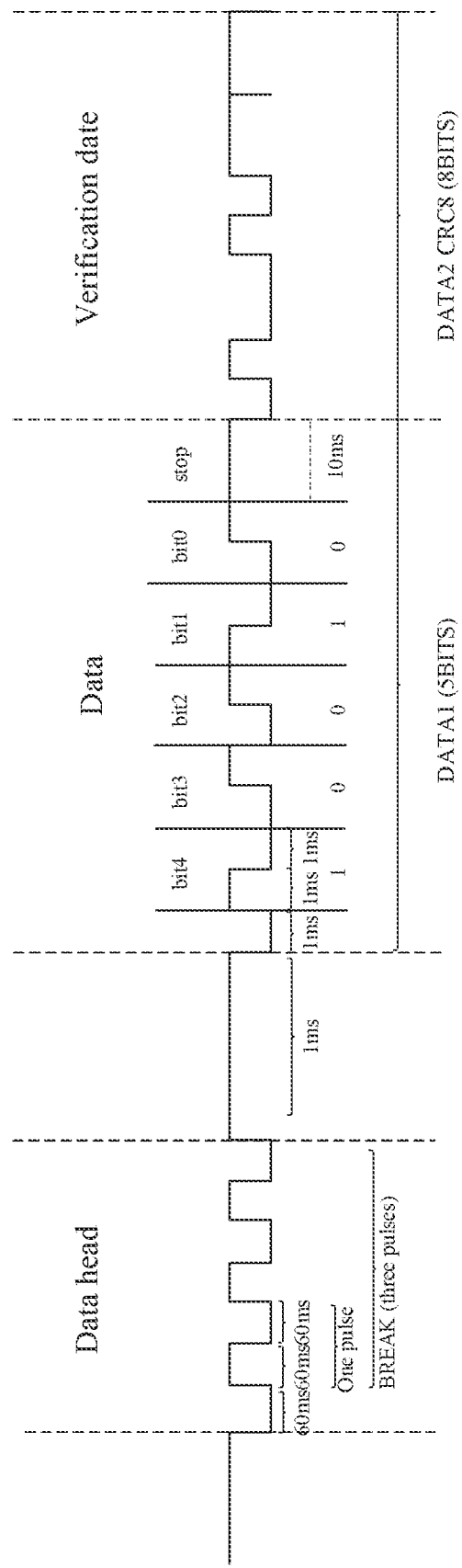
FIG. 5 is a schematic diagram of the format of a change signal in the method for changing signal analysis protocols of a wireless lamp according to the first embodiment of the application.

Preferably, as shown in FIG. 5, the change signal comprises a data head, protocol data and verification data. In this embodiment, the data head is specifically a piece of 6 BITS data with a fixed value and comprises three continuous pulses, each pulse sequentially comprises a 60 ms high level and a 60 ms low level, the protocol data is specifically a piece of 5 BITS data and comprises protocol information, and the verification data is specifically a piece of 8 BITS data obtained by verifying the data head and the protocol data through a CRC8 algorithm.

In the application, controller analysis protocols of multiple manufacturers are integrated in the first control module of the wireless lamp, and a change signal is generated by the encoder through a wireless coding method, transmitted wirelessly, and finally received and analysed by the wireless lamp to activate a corresponding analysis protocol, such that the analysis protocol of the lamp can be changed quickly, the universality of the lamp is improved, and the protocol can be switched more conveniently, and does not need to be changed in a wired manner anymore after a controller is changed.

The above embodiments are merely preferred ones of the application. It should be pointed out that these preferred embodiments should not be construed as limitations of the application, and the protection scope of the application should be defined by the claims. Those ordinarily skilled in the art can make some improvements and embellishments without departing from the spirit and scope of the application, and all these improvements and embellishments should also fall within the protection scope of the application.

What is claimed is:

1. A signal analysis protocol changing method for a wireless lamp, the wireless lamp receiving a control signal, sent by a preset controller, by means of a lamp holder and correspondingly analysing the control signal according to a selected analysis protocol to obtain light control information to drive a lamp bead to change emitted light, wherein the signal analysis protocol changing method for the wireless lamp comprises:
    Step 1: presetting a plurality of analysis protocols in the wireless lamp, wherein the analysis protocols are in one-to-one correspondence with control signals sent by different manufacturers;
    Step 2: presetting a plurality of change signals in an encoder, wherein the change signals are used to activate the corresponding preset analysis protocols in the wireless lamp;
    Step 3: establishing a communication connection between the encoder and the wireless lamp;
    Step 4: transmitting a change signal to the wireless lamp by the encoder;
    Step 5: receiving and analysing the change signal by the wireless lamp;
    Step 6: activating the corresponding analysis protocol according to an analysis result by the wireless lamp; and
    Step 7: disconnecting the communication between the wireless lamp and the encoder;
    wherein the wireless lamp comprises an LED lamp, an LED drive module, a first control module and an infrared signal receiving module, and the analysis protocols are preset in the first control module; and
    the encoder is an infrared encoder, the infrared encoder comprises a second infrared signal transmitting module corresponding to the infrared signal receiving module, and a third control module, and the change signals are presets in the third control module and are infrared coded signals.

2. The signal analysis protocol changing method for a wireless lamp according to claim 1, wherein the lamp holder comprises a first infrared signal transmitting module corresponding to the infrared signal receiving module, and a second control module, and the second control module is configured for converting the control signal into an infrared control signal and then transmitting the infrared control signal to the wireless lamp through the first infrared signal transmitting module.

3. The signal analysis protocol changing method for a wireless lamp according to claim 1, wherein the analysis protocols comprise DMX512, KNX, MODBUS and ARTNET.

4. The signal analysis protocol changing method for a wireless lamp according to claim 3, wherein the data head is specifically a piece of 6 BITs data with a fixed value, and the protocol data is specifically a piece of 5 BITS data and comprise analysis protocol information.

5. The signal analysis protocol changing method for a wireless lamp according to claim 1, wherein the change signal comprises a data head, protocol data and verification data.

6. The signal analysis protocol changing method for a wireless lamp according to claim 5, wherein the data head comprises three continuous pulses, and each of the pulses sequentially comprises a 60 ms high level and a 60 ms low level.

7. The signal analysis protocol changing method for a wireless lamp according to claim 5, wherein the verification data is specifically a piece of 8 BITS data obtained by verifying the data head and the protocol data through a CRC8 algorithm.

\* \* \* \* \*